(12) United States Patent
Ji (10) Patent No.: US 8,032,018 B2
(45) Date of Patent: Oct. 4, 2011

(54) PHOTOGRAPHING APPARATUS HAVING A FOLDING FLASH UNIT

(75) Inventor: Eun-hoi Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/647,157

(22) Filed: Dec. 24, 2009

(65) Prior Publication Data
US 2010/0158497 A1   Jun. 24, 2010

(30) Foreign Application Priority Data

Dec. 24, 2008 (KR) .................. 10-2008-0133781

(51) Int. Cl.
*G03B 15/03* (2006.01)
(52) U.S. Cl. ...................................... 396/178

(58) Field of Classification Search .................. 396/176, 396/177, 178, 165
See application file for complete search history.

(56) References Cited

U.S. PATENT DOCUMENTS

| | | | | |
|---|---|---|---|---|
| 4,893,139 A | * | 1/1990 | Alligood et al. | 396/174 |
| 5,253,003 A | * | 10/1993 | Fujii et al. | 396/175 |
| 5,329,327 A | * | 7/1994 | Arai et al. | 396/177 |

* cited by examiner

*Primary Examiner* — Clayton E LaBalle
*Assistant Examiner* — Warren Fenwick
(74) *Attorney, Agent, or Firm* — Drinker Biddle & Reath LLP (57) ABSTRACT

Provided is a photographing apparatus. The photographing apparatus may illuminate auto focus (AF) auxiliary light onto a subject without regard to an opening/closing of a flash because the flash may illuminate the light out of a main body even when the flash is received in the main body in a retracted position.

16 Claims, 9 Drawing Sheets

PHOTOGRAPHING APPARATUS HAVING A FOLDING FLASH UNIT

CROSS-REFERENCE TO RELATED PATENT APPLICATIONS

This application claims the benefit of Korean Patent Application No. 10-2008-0133781, filed on Dec. 24, 2008, in the Korean Intellectual Property Office, the disclosure of which is incorporated herein in its entirety by reference.

BACKGROUND

The present invention relates to a photographing apparatus, and more particularly, to a photographing apparatus capable of illuminating an auto focus (AF) auxiliary light without regard to the opening/closing of a flash since the flash may disperse light to outside of a main body of a camera even when the flash is included in the main body of the camera.

Recently, digital single-lens reflex (DSLR) cameras that provide photographs of high image quality and generate digital images have been widely distributed. Here, of the DSLR cameras, a single-lens reflex camera is one in which an image of a subject is transferred to a viewfinder and light is transmitted to a photographing sensor through one lens. Compact digital cameras are twin lens reflex cameras which have been widely distributed. Therefore, an image shown to a user and an image that is actually captured are different from each other, and thus, the image transferred to a sensor may be displayed on a screen.

In conventional DSLR cameras, a mirror is formed on an optical axis of the lens to rotate within a predetermined angle range with respect to the optical axis. The light of an object, as obtained from the lens, is reflected by the mirror and focused on a focusing plate, and thus, the user may identify the image focused on the focusing plate using a pentaprism and a viewfinder. At this time, when a shutter-release signal is input, the mirror rotates within a predetermined range with respect to the optical axis and rises to escape from the optical axis of the lens. In addition, when the shutter is opened by a driving control of a shutter driving circuit, the image of the subject is formed on an imaging device.

The conventional DSLR cameras generally include a flash, which is equipment for lighting a photographing scene by generating an instant flash. The light emission of the flash is made for $1/1000$ sec., and a color temperature at this time is generally about 5,500 K. The flash may be multifunctional, however, the flash is generally used to light the photographing scene when the light intensity is low.

Digital cameras mostly adopt an auto focus (AF) function, which automatically focuses the subject by measuring a distance to the subject. However, when there is no sufficient contrast on the subject in a dark scene, it is difficult to determine the position of the subject, and thus, the focusing cannot be performed. Therefore, in recent digital cameras, an AF auxiliary light is illuminated onto the subject in order to compensate for the lack of brightness.

Figure 1:
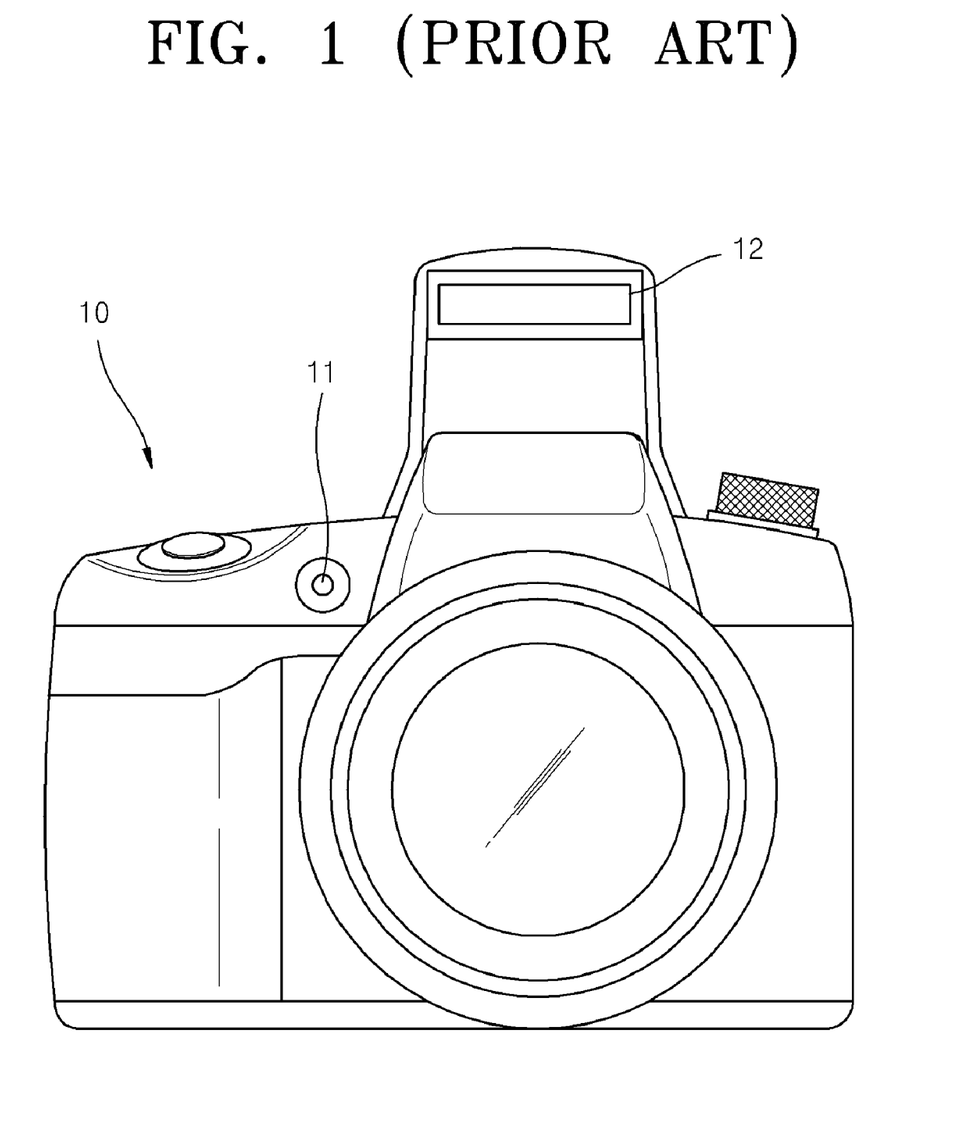
FIG. 1 is a diagram showing a conventional digital single lens reflex (DSLR) camera.

FIG. 1 shows a conventional DSLR camera.

Referring to FIG. 1, the conventional DSLR camera 10 additionally includes an AF auxiliary light source 11. Therefore, when the environment surrounding a subject is dark, the AF auxiliary light source 11 illuminates light onto the subject to perform an AF operation.

However, in this case, since the additional AF auxiliary light source 11 is included to perform the AF operation, a structure of the camera becomes complex, the volume and weight of the camera increase, and fabrication costs of the camera also increase.

On the other hand, a flash 12 is opened to illuminate the AF auxiliary light onto the subject, and then, the AF operation may be performed.

However, the AF auxiliary light is only illuminated onto the subject only when the flash 12 is opened and the flash 12 emits light whenever photographing, and thus, the photographing may not be performed according to the user's intention. Moreover, the flash 12 is opened when the AF operation is performed and closed when the AF operation is not performed, and thus, the user may experience this inconvenience.

SUMMARY

The present invention provides a photographing apparatus that may illuminate an auto focus (AF) auxiliary light onto a subject without regard to the opening/closing of a flash.

According to an aspect of the present invention, there is provided a photographing apparatus including: a main body; and a flash formed to be received and drawn in/from the main body, wherein the flash emits light out of the main body when the flash is received in the main body. Thus, the flash is operable regardless of whether the flash is in an extended or retracted position with respect to the main body.

A light emitting direction of the flash when the flash is received in the main body and a light emitting direction of the flash when the flash is withdrawn from the main body may be substantially the same as each other.

The photographing apparatus may further include: a flash cover shielding a side of the flash when the flash is received in the main body, wherein the flash cover is formed to transmit at least a part of the light emitted from the flash.

The flash cover may be formed of a transparent material or a translucent material so that the at least a part of the light emitted from the flash is transmitted through the flash cover.

The flash cover may be formed as a smart mirror so that the at least a part of the light emitted from the flash is transmitted through the flash cover.

The flash cover may include one or more holes on a position corresponding to the flash so that the at least a part of the light emitted from the flash is transmitted through the flash cover.

The photographing apparatus may further include: a flash housing in which the flash is coupled, wherein the main body comprises a flash receiving portion that receives the flash housing, and the flash housing is formed to rotate with respect to the main body.

The main body may include a protrusion on a portion contacting to the flash so as to restrain a rotation of the flash while the flash housing rotates with respect to the main body to be inserted into the main body so as to be received in the main body.

The protrusion may be formed on a rotating path of the flash.

When the flash contacts the protrusion, the rotation of the flash may be prevented while the flash housing continues to rotate.

The light emitting direction of the flash when the flash is received in the main body and the light emitting direction of the flash when the flash is withdrawn from the main body may be maintained constantly due to the protrusion.

A guide groove may be formed in one of the flash receiving portion and the flash and a guide protrusion may be formed on the other so that the path of the flash is guided by the guide groove and the guide protrusion when the flash is received in the main body.

The light emitting direction of the flash when the flash is received in the main body and the light emitting direction of the flash when the flash is withdrawn from the main body may be maintained constantly due to the guide groove and the guide protrusion.

An elastic member may be disposed between the flash and the flash housing so as to provide the flash with an elastic force for rotating the flash in a constant direction.

The elastic member may provide the flash with the elastic force so that the flash emits light toward a front of the main body when the flash and flash housing are drawn from the main body.

The photographing apparatus may further include: a lens coupled to a side of the main body, wherein the light emitted from the flash is radiated in a direction that is substantially parallel with an optical axis of the lens.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, a photographing apparatus according to various embodiments the present invention will be described with reference to accompanying drawings.

First Embodiment

Figure 2:
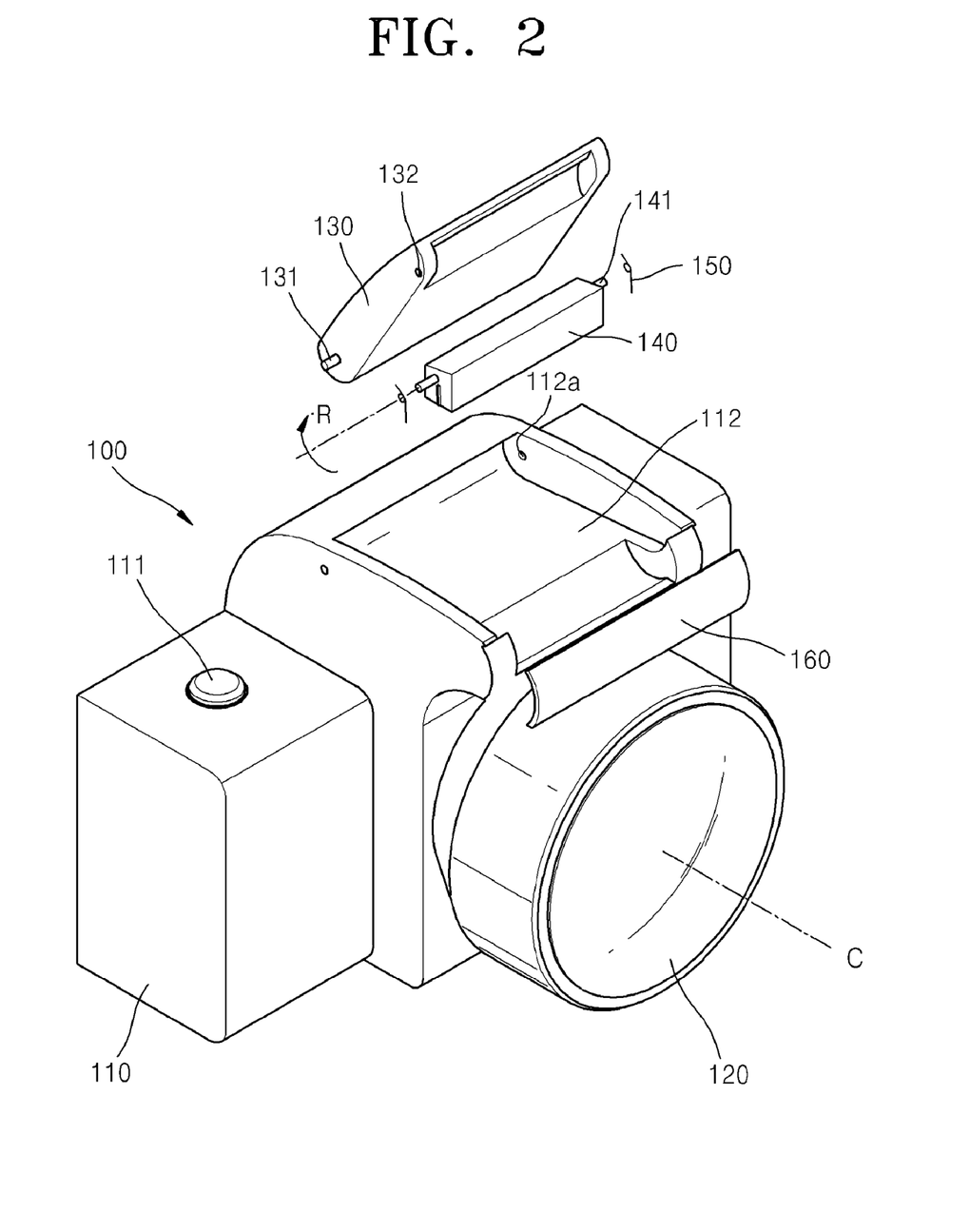
FIG. 2 is a partially exploded perspective view of a photographing apparatus according to an embodiment of the present invention.
Figure 3:
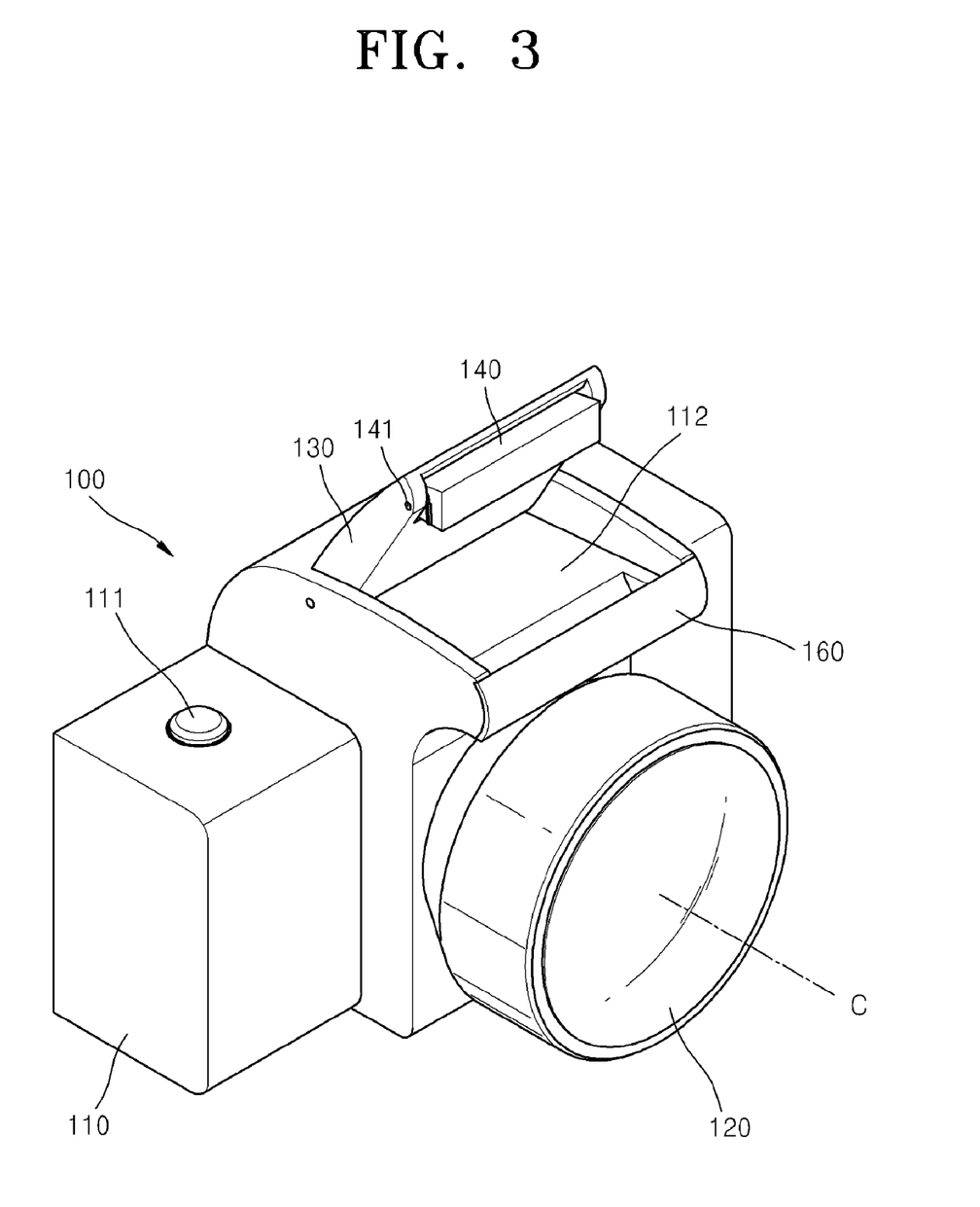
FIG. 3 is a perspective view of the photographing apparatus of FIG. 2.

FIG. 2 is a partially exploded perspective view of a photographing apparatus 100 according to an embodiment of the present invention, and FIG. 3 is a perspective view of the photographing apparatus 100 of FIG. 2.

Referring to FIGS. 2 and 3, the photographing apparatus 100 of the present embodiment includes a main body 110, a lens 120, a flash housing 130, a flash 140, an elastic member 150, and a flash cover 160.

The main body 110 forms an outer appearance of the photographing apparatus 100, and a shutter-release button 111 and a flash receiving portion 112 are formed in a side of the main body 110.

The shutter-release button 111 of the main body 110 is opened and closed to expose an imaging device, for example, a charge-coupled device (CCD) or a complementary metal oxide semiconductor (CMOS), to light, and to expose the subject to light appropriately to record an image of the subject in the imaging device, in communication with a diaphragm (not shown). In more detail, the shutter-release button 111 generates a first image capturing signal and a second image capturing signal by an input of a user. When the first image capturing signal, that is, a half-shutter signal, is input, the main body 110 adjusts a focus and a light intensity. When the subject is focused and the light intensity is adjusted due to the input of the first image capturing signal, the second image capturing signal is input to photograph the subject.

The flash receiving portion 112 is depressed from the side of the main body 110, in general, that is, from an upper side of the main body 110. Holes 112a are formed in internal side surfaces of the flash receiving portion 112 so that a rotary shaft 131 of the flash housing 130 may be inserted in the holes 112a. Therefore, the flash housing 130 may rotate with respect to the main body 110 about the rotary shaft 131.

The lens 120 is coupled to a side of the main body 110. The lens 120 receives light from an external light source to process the images.

The flash housing 130, to which the flash 140 is coupled, is coupled to the side of the main body 110 in which the flash receiving portion 112 is formed. As described above, the rotary shaft 131 protrudes from both sides of the flash housing 130, and the rotary shaft 131 is inserted into the holes 112a of the flash receiving portion 112 to insert/draw the flash housing 130 into/from the main body 110. In addition, a hole 132 is formed in the flash housing 130, and a rotary shaft 141 of the flash 140 is inserted into the hole 132.

The flash 140 generates instant light to illuminate a photographing scene. The flash 140 is generally disposed on the upper portion of the main body 110, and is coupled to the flash housing 130 to rotate with the flash housing 130 so as to be inserted and drawn into/from the main body 110. In more detail, the rotary shaft 141 protrudes from both sides of the flash 140. When the rotary shaft 141 is inserted into the hole 132 of the flash housing 130, the flash 140 may rotate with respect to the flash housing 130.

The elastic member 150 is installed on the rotary shaft 141 of the flash 140. The elastic member 150 is disposed between the flash 140 and the flash housing 130 to provide the flash 140 with a predetermined elastic force. For example, the elastic member 150 may provide the flash 140 with the predetermined elastic force so that the flash 140 rotates in a direction of arrow R shown in FIG. 2. Due to the elastic member 150, the flash 140 may illuminate the light in a direction that is the same as an optical axis direction of the lens 120 (direction C of FIG. 2), that is, toward a front of the main body 110 when the flash housing 130 is opened from the main body 110.

The flash cover 160 is disposed on a front portion of the flash receiving portion 112 of the main body 110. That is, the flash cover 160 is formed to face the flash 130 when the flash housing 130 and the flash 140, which is coupled to the flash housing 130, are received in the flash receiving portion 112. In the present embodiment, the flash cover 160 may be formed of a transparent material or a translucent material such as glass, acrylic or similar material, so that the light illuminated from the flash 140 may be radiated out of the main body 110. Otherwise, the flash cover 160 may be formed as a smart mirror so that the light may be transmitted only when the flash 140 emits the light. Moreover, although not shown in the drawings, the flash cover 160 may include one or more holes so that the light emitted from the flash 140 may be radiated out of the main body 110. As described above, since the flash cover 160 is formed so that at least a part of the light emitted from the flash 140 may be transmitted through the flash cover 160, auto focusing (AF) auxiliary light may be illuminated to the subject even when the flash 140 is received in the main body 110.

Although not shown in FIGS. 2 and 3, a predetermined protrusion 170 (see FIG. 4) is formed on an upper end portion of the flash cover 160. The predetermined protrusion 170 is formed on the rotating path of the flash 140 to restrain the rotation of the flash 140 while the flash housing 130 is inserted in the main body 110 to be received in the main body 110. Owing to the protrusion, the light emitting direction of the flash 140 when the flash 140 is received in the main body 110 and when the flash 140 is withdrawn from the main body 110 may be maintained to be the same as each other. The structure and operation of the predetermined protrusion 170 will be described below.

Hereinafter, inserting and drawing operations of the flash 140 in the photographing apparatus 100 according to the current embodiment will be described.

Figure 4:
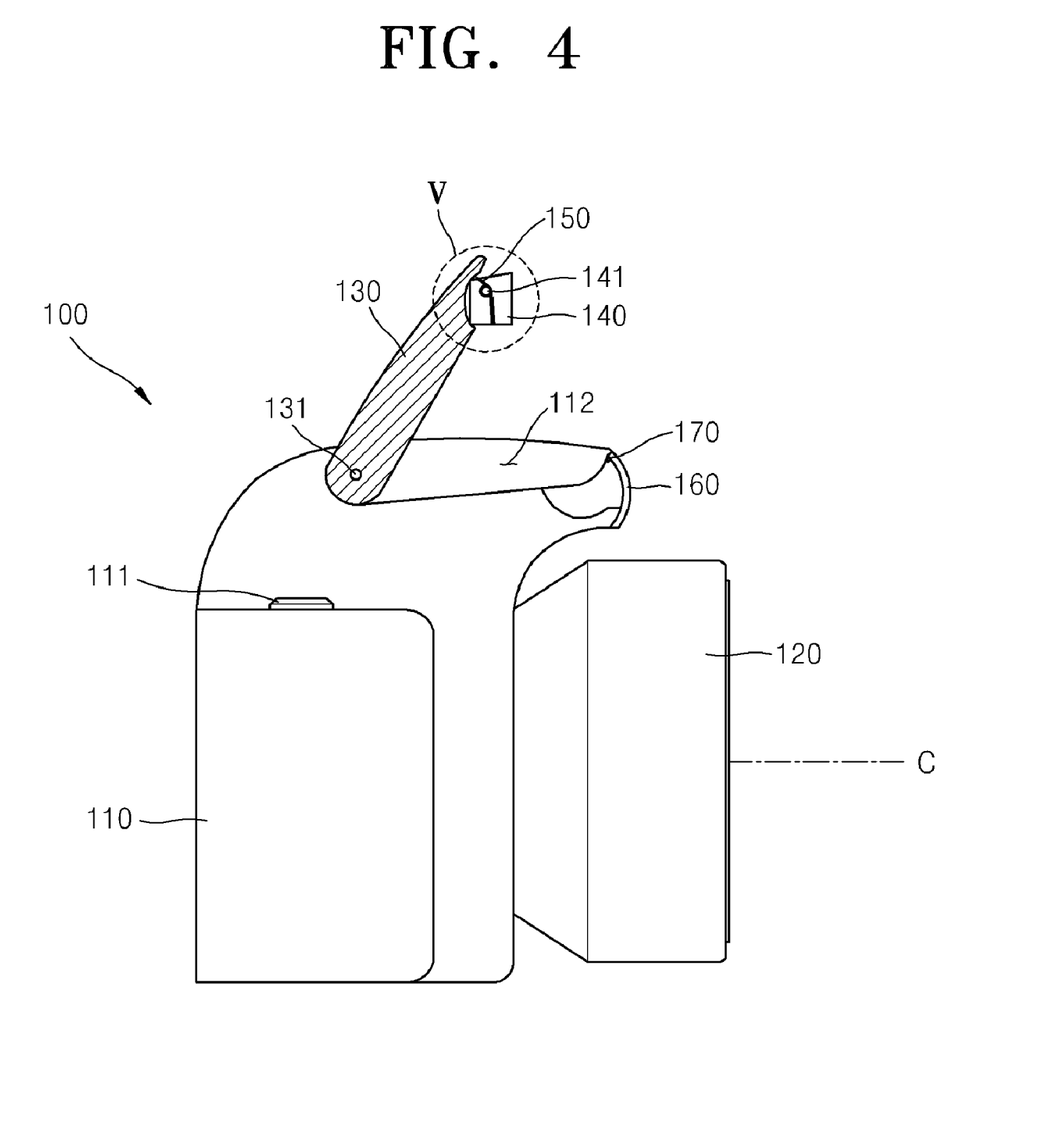
FIG. 4 is a side view showing a flash and a flash housing drawn from a main body in the photographing apparatus of FIG. 2.
Figure 5:
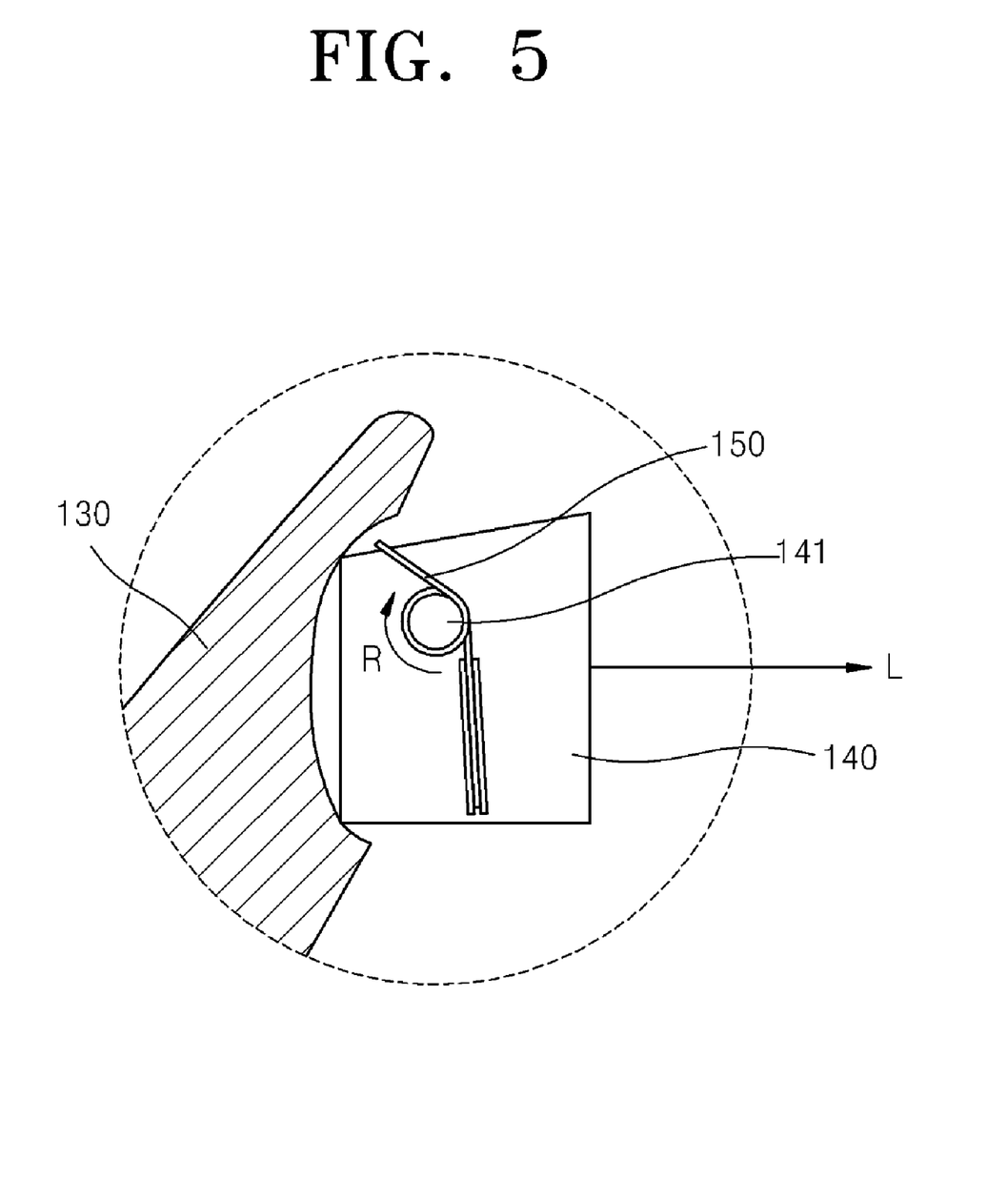
FIG. 5 is an expanded view of the part denoted by V shown in FIG. 4.

FIG. 4 is a side view showing the flash 140 and the flash housing 130 drawn from the main body 110, and FIG. 5 is an expanded view of dotted circle V shown in FIG. 4.

Referring to FIGS. 4 and 5, when the flash 140 and the flash housing 130 are drawn from the main body 110, the elastic member 150 provides the flash 140 with a predetermined elastic force. That is, the elastic member 150 provides the flash 140 with a constant elastic force so that the flash 140 rotates in a direction denoted by the arrow R of FIG. 5. Due to the elastic member 150, the flash 140 may emit the light in the direction that is the same as the optical axis direction of the lens 120 (C direction in FIG. 4), that is, toward the front of the main body 110 (L direction in FIG. 5) when the flash housing 130 is drawn from the main body 110.

Figure 6:
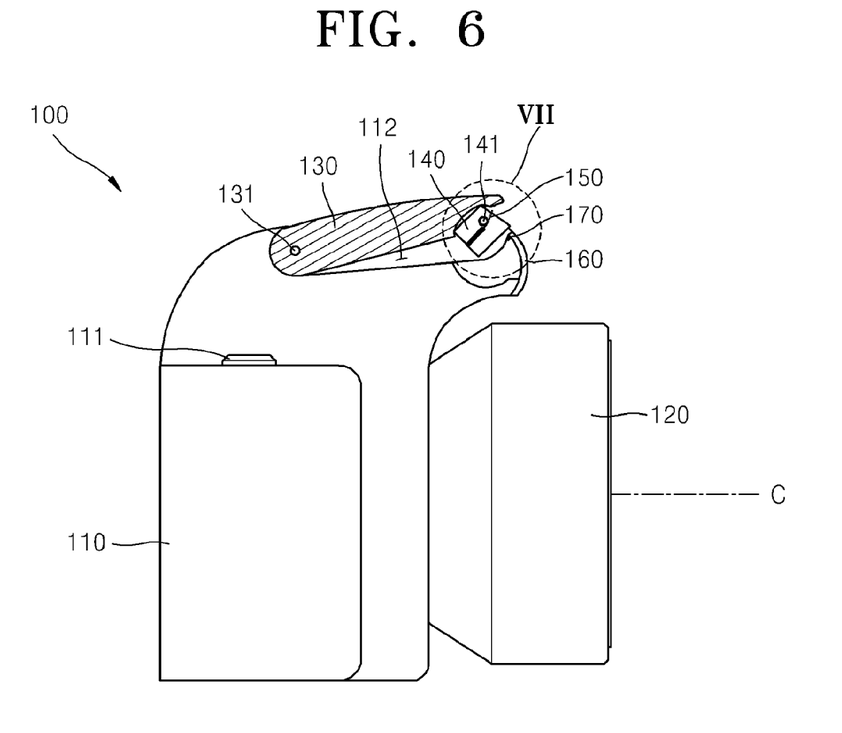
FIG. 6 is a side view showing the flash and the flash housing inserted in the main body in the photographing apparatus of FIG. 2.
Figure 7:
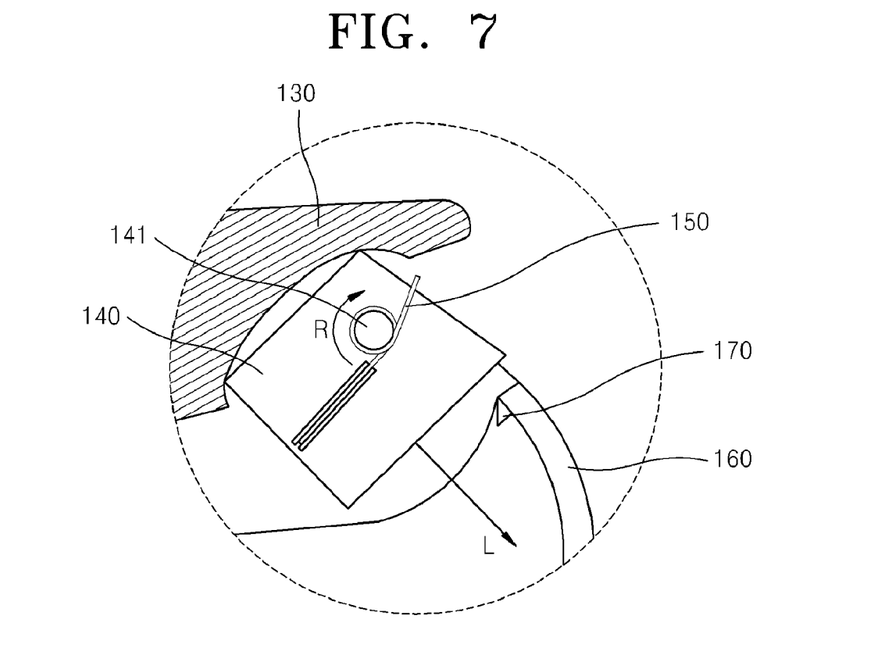
FIG. 7 is an expanded view of the part denoted by VII shown in FIG. 6.

FIG. 6 is a side view showing the flash 140 and the flash housing 130 inserted in the main body 110. FIG. 7 is an expanded view of dotted circle VII of FIG. 6.

When the flash 140 and the flash housing 130 are inserted in the main body 110, the elastic member 150 provides the flash 140 with the predetermined elastic force so that the flash 140 rotates in the direction denoted by arrow R in FIG. 7. Therefore, the flash 140 and the flash housing 130 rotate together, and the light emitting direction (L of FIG. 7) of the flash 140 is not the same as the optical axis direction (C in FIG. 6) of the lens 120.

When the flash 140 and the flash housing 130 are continuously inserted in the main body 110 by being rotated and right before the flash 140 contacts the predetermined protrusion 170 as shown in FIG. 6, the flash 140 faces a bottom surface of the flash receiving portion 112. Therefore, when the flash 140 and the flash housing 130 are received in the main body 110, the flash 140 cannot emit the AF auxiliary light out of the main body 110. In order to solve the above problem, in the photographing apparatus 100 of the present embodiment, the light emitting direction of the flash 140 when the flash 140 is received in the main body 110 and the light emitting direction of the flash 140 when the flash 140 is drawn from the main body 110 are the same as each other. This feature is described in more detail below.

Figure 8:
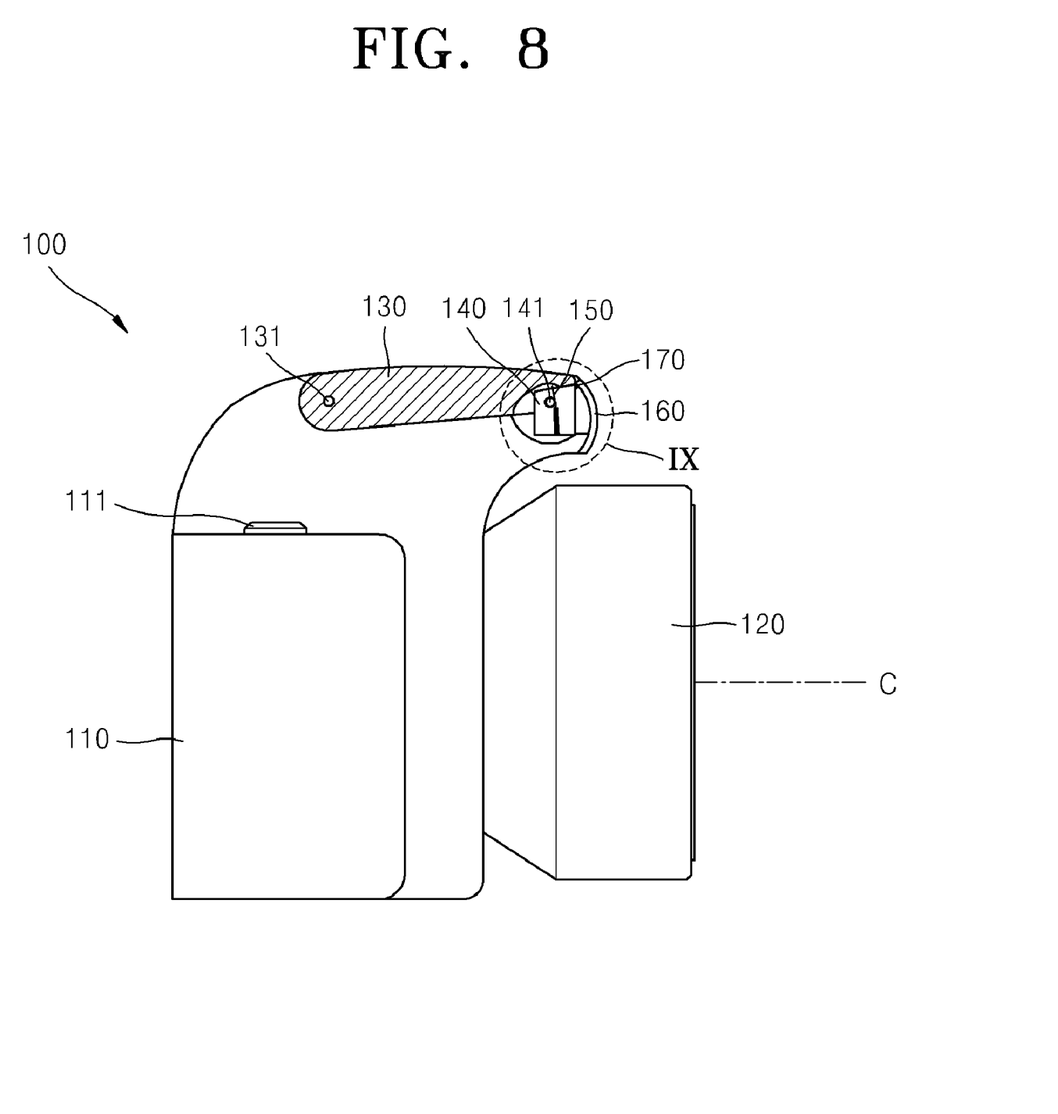
FIG. 8 is a side view showing the flash and the flash housing received in the main body in the photographing apparatus of FIG. 2.
Figure 9:
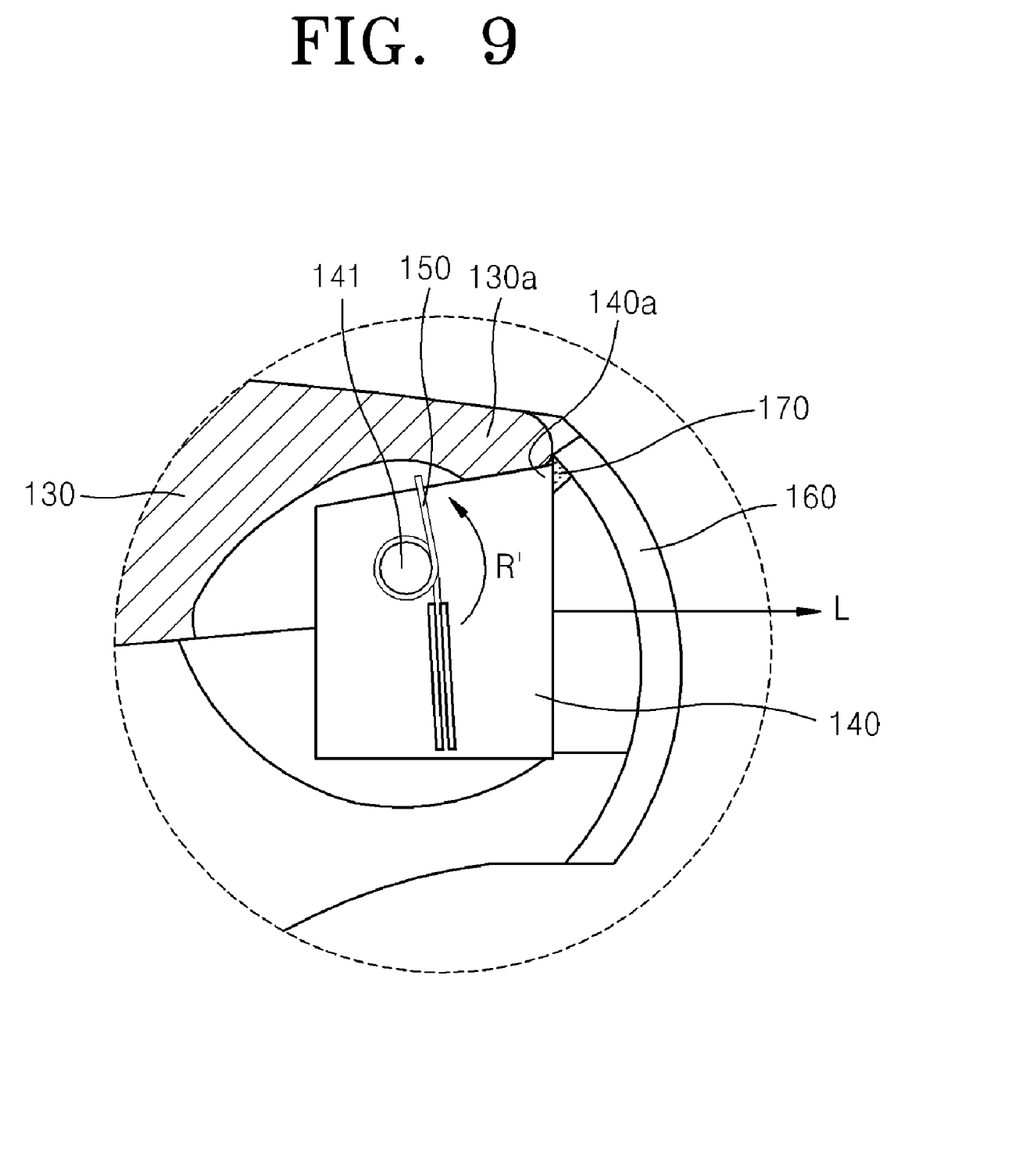
FIG. 9 is an expanded view of the part denoted by IX shown in FIG. 8.

FIG. 8 is a side view showing the flash 140 and the flash housing 130 received in the main body 110, and FIG. 9 is an expanded view of dotted circle IX in FIG. 8.

Referring to FIGS. 8 and 9, the predetermined protrusion 170 is formed on the upper end portion of the flash cover 160. The predetermined protrusion 170 is formed on the rotating path of the flash 140 so as to restrain the rotation of the flash 140 with respect to the flash housing 130 while the flash housing 130 is inserted in the main body 110 to be received by the main body 110. That is, when an end portion 140a of the flash 140 contacts the predetermined protrusion 170 while the flash housing 130 and the flash 140 that is coupled to the flash housing 130 rotate together about the rotary shaft 130, the flash 140 cannot rotate further, and the flash housing 130 is continuously rotated toward the main body 110. In this state, when the flash housing 130 continues to rotate toward the main body 110, an end portion 130a of the flash housing 130 pushes the end portion 140a of the flash 140, and accordingly, the flash 140 rotates in a direction denoted by arrow R' of FIG. 9 about the rotary shaft 141. In addition, when the flash housing 130 continues to rotate so that the flash 140 and the flash housing 130 are completely received in the flash receiving portion 112, the light emitting direction of the flash 140 (L direction in FIG. 9) becomes the same as the optical axis direction of the lens 120 (C direction in FIG. 8), and accordingly, the flash 140 may illuminate the light toward the front of the main body 110.

At this time, the flash cover 160 may be formed of the transparent material or the translucent material such as the glass, acrylic, or similar material so that the light emitted from the flash 140 may be radiated out of the main body 110. Otherwise, one or more holes may be formed in the flash cover 160 so that the light emitted from the flash 140 may radiated out of the main body 110. As described above, since the flash cover 160 is formed to transmit at least a part of the light emitted from the flash 140, the AF auxiliary light may be illuminated to the subject even when the flash 140 is received in the main body 110.

On the other hand, when the flash 140 and the flash housing 130 are received in the main body 110 as shown in FIG. 8, and then the flash 140 and the flash housing 130 are drawn from the main body 110, as shown in FIG. 4, the flash 140 returns to the original position shown in FIG. 4 due to the elastic force provided by the elastic member 150. Therefore, the flash 140 may illuminate the light in the same direction as the optical axis direction of the lens 120 (C direction in FIG. 4), that is, toward the front of the main body 110 (L direction of FIG. 5).

According to a photographing apparatus 100 of the present embodiment, an additional AF auxiliary light source is not necessary, and thus, the structure of the photographing apparatus 100 may be simple. In addition, the AF auxiliary light may be illuminated to the subject even when the flash 140 is closed. In addition, since there is no need to emit the light using the flash 140 whenever photographing, the photographing may be performed according to the intent of the user. Moreover, there is no need to open/close the flash 140 when the AF operation is performed, and thus, the user's convenience may be improved.

Second Embodiment

Figure 10:
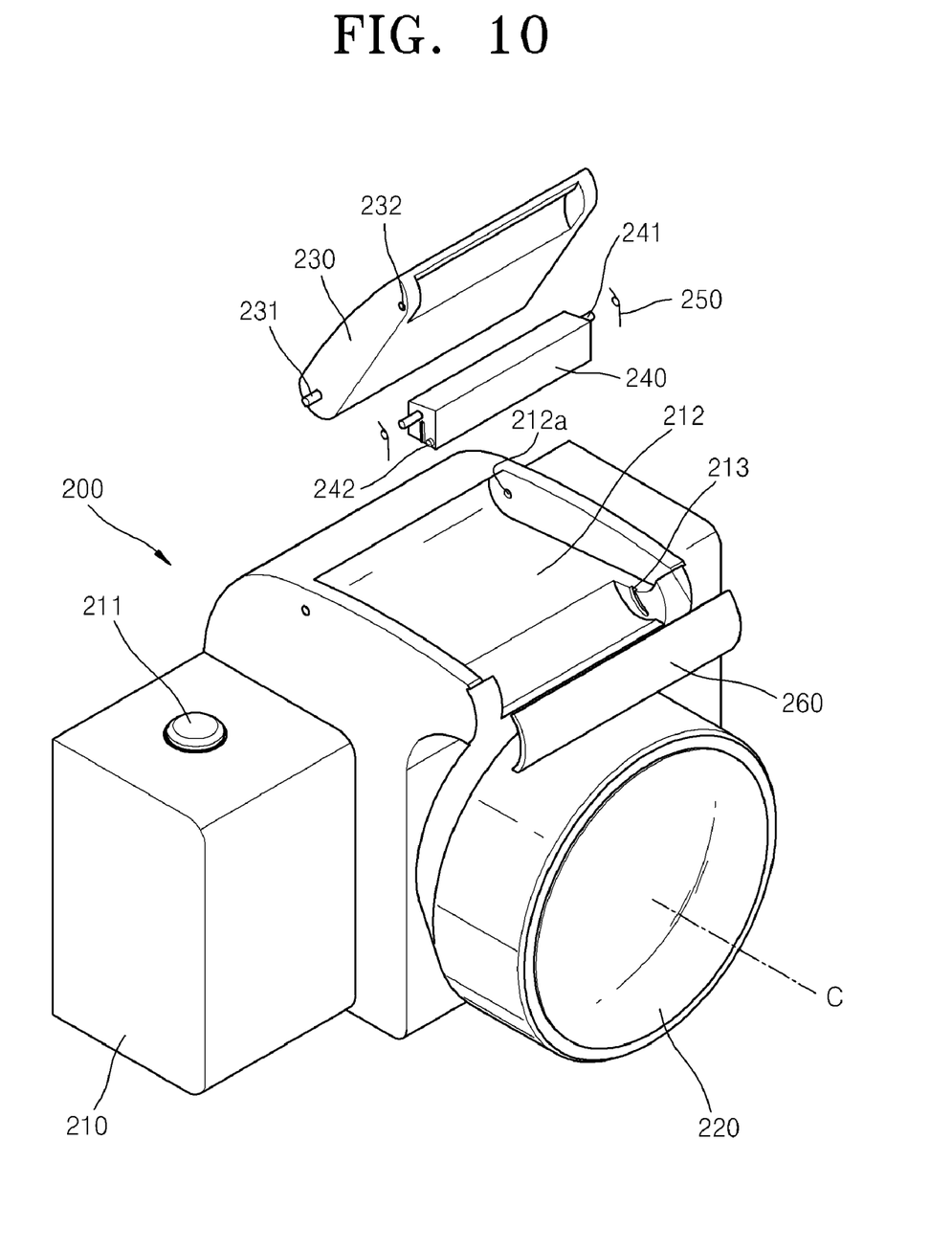
FIG. 10 is a perspective view of a photographing apparatus according to another embodiment of the present invention.

FIG. 10 is a perspective view of a photographing apparatus 200 according to another embodiment of the present invention.

Referring to FIG. 10, the photographing apparatus 200 of the present embodiment includes a main body 210, a lens 220, a flash housing 230, a flash 240, an elastic member 250, and a flash cover 260.

The main body 210 forms an outer appearance of the photographing apparatus 200, and a shutter-release button 211 and a flash receiving portion 212 are formed in a side of the main body 210. The flash receiving portion 212 is depressed from a side of the main body 210, in general, from an upper side of the main body 210. The lens 220 is coupled to a side of the main body 210. The flash housing 230, to which the flash 240 is coupled, is coupled to the side of the main body 210. In more detail, holes 212a are formed in internal side surfaces of the flash receiving portion 212, and a rotary shaft 231 of the flash housing 230 is inserted in the holes 212a. In addition, the flash housing 230 includes a hole 232, to which a rotary shaft 241 of the flash 240 is inserted. The elastic member 250 is installed on the rotary shaft 241 of the flash 240 to provide the flash 240 with a predetermined elastic force. In addition, the flash cover 260 is disposed on a front portion of the flash receiving portion 212 of the main body 210.

The photographing apparatus 200 of the present embodiment is different from that of the previous embodiment in that a guide protrusion 242 and a guide groove 213 are respectively formed on the flash 240 and in the main body 210 to maintain the light emitting direction of the flash 240 to be the same as that of the optical axis direction of the lens 220 when the flash 240 is received in the main body 210 and the light emitting direction of the flash 240 when the flash is withdrawn from the main body 210 constantly.

In more detail, as shown in FIG. 10, the guide protrusion 242 is formed on an end portion of the flash 240, and the guide groove 213 is formed in the flash receiving portion 212 of the main body 210, that is, as a rotating path of the guide protrusion 242 of the flash 240. Therefore, the guide protrusion 242 and the guide groove 213 guide the moving path of the flash 240 when the flash housing 230 is rotated into the main body 210 to be received by the main body 210. That is, when the guide protrusion 242 is engaged with the guide groove 213 while the flash housing 230 and the flash 240 that is coupled to the flash housing 230 rotate together about the rotary shaft 230, the flash 240 moves along the guide groove 213 separately from the flash housing 230. In addition, when the flash 230 and the flash housing 240 are completely received in the flash receiving portion 212, the light emitting direction of the flash 240 is the same as the optical axis direction of the lens 220. Accordingly, the flash 240 may illuminate the light toward the front of the main body 210.

According to the photographing apparatus 200 of the present embodiment, an additional AF auxiliary light source is not necessary, and thus, the structure of the photographing apparatus 200 may be simple. In addition, the AF auxiliary light may be illuminated to the subject even when the flash 230 is closed. In addition, since there is no need to emit light using the flash 230 whenever photographing, the photographing may be performed according to the intent of the user. Moreover, there is no need to open/close the flash 230 when the AF operation is performed, and thus, the user's convenience may be improved.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, processing elements, logic elements, etc.

The particular implementations shown and described herein are illustrative examples of the invention and are not intended to otherwise limit the scope of the invention in any way. For the sake of brevity, conventional electronics, control systems, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are intended to be used generally and are not limited solely to mechanical embodiments. Numerous modifications and adaptations will be readily apparent to those skilled in this art without departing from the spirit and scope of the present invention.

What is claimed is:

1. A photographing apparatus comprising:
   a main body; and
   a flash formed to be received in and withdrawn from the main body, and correspondingly positionable in a retracted and extended position;
   wherein the flash emits light out of the main body when the flash is received in the main body;
   wherein a light emitting direction of the flash when the flash is received in the main body and a light emitting direction of the flash when the flash is withdrawn from the main body are substantially the same as each other.

2. The photographing apparatus of claim 1, further comprising:
   a flash cover shielding a side of the flash when the flash is received in the main body,
   wherein the flash cover is formed to transmit at least a part of the light emitted from the flash.

3. The photographing apparatus of claim 2, wherein the flash cover is formed of a transparent material or a translucent material so that the at least a part of the light emitted from the flash is transmitted through the flash cover.

4. The photographing apparatus of claim 2, wherein the flash cover is formed as a smart mirror so that the at least a part of the light emitted from the flash is transmitted through the flash cover.

5. The photographing apparatus of claim 2, wherein the flash cover comprises one or more holes on a position corresponding to the flash so that the at least a part of the light emitted from the flash is transmitted through the flash cover.

6. The photographing apparatus of claim 1, further comprising:
a flash housing in which the flash is coupled,
wherein
the main body comprises a flash receiving portion that receives the flash housing, and the flash housing is formed to rotate with respect to the main body.

7. The photographic apparatus of claim 1, wherein the light emitting direction constitutes a single axis along which the flash is directed.

8. A photographing apparatus comprising:
a main body; and
a flash formed to be received in and withdrawn from the main body, and correspondingly positionable in a retracted and extended position;
wherein the flash emits light out of the main body when the flash is received in the main body;
the photographing apparatus further comprising:
a flash housing in which the flash is coupled,
wherein
the main body comprises a flash receiving portion that receives the flash housing;
the flash housing is formed to rotate with respect to the main body; and
the main body comprises a protrusion on a portion contacting the flash so as to restrain a rotation of the flash while the flash housing rotates with respect to the main body to be inserted into the main body so as to be received in the main body.

9. The photographing apparatus of claim 8, wherein the protrusion is formed on a rotating path of the flash.

10. The photographing apparatus of claim 8, wherein when the flash contacts the protrusion, the rotation of the flash is prevented while the flash housing continues to rotate.

11. The photographing apparatus of claim 8, wherein the light emitting direction of the flash when the flash is received in the main body and the light emitting direction of the flash when the flash is withdrawn from the main body are maintained constantly due to the protrusion.

12. A photographing apparatus comprising:
a main body; and
a flash formed to be received in and withdrawn from the main body, and correspondingly positionable in a retracted and extended position;
wherein the flash emits light out of the main body when the flash is received in the main body;
the photographing apparatus further comprising:
a flash housing in which the flash is coupled,
wherein
the main body comprises a flash receiving portion that receives the flash housing;
the flash housing is formed to rotate with respect to the main body; and
a guide groove is formed in one of the flash receiving portion and the flash and a guide protrusion is formed on the other so that the path of the flash is guided by the guide groove and the guide protrusion when the flash is received in the main body.

13. The photographing apparatus of claim 12, wherein the light emitting direction of the flash when the flash is received in the main body and the light emitting direction of the flash when the flash is withdrawn from the main body are maintained constantly due to the guide groove and the guide protrusion.

14. A photographing apparatus comprising:
a main body; and
a flash formed to be received in and withdrawn from the main body, and correspondingly positionable in a retracted and extended position;
wherein the flash emits light out of the main body when the flash is received in the main body;
the photographing apparatus further comprising:
a flash housing in which the flash is coupled,
wherein
the main body comprises a flash receiving portion that receives the flash housing;
the flash housing is formed to rotate with respect to the main body; and
an elastic member is disposed between the flash and the flash housing so as to provide the flash with an elastic force for rotating the flash in a constant direction.

15. The photographing apparatus of claim 14, wherein the elastic member provides the flash with the elastic force so that the flash emits light toward a front of the main body when the flash and the flash housing are drawn from the main body.

16. A photographing apparatus comprising:
a main body;
a flash formed to be received in and withdrawn from the main body, and correspondingly positionable in a retracted and extended position;
wherein the flash emits light out of the main body when the flash is received in the main body;
the photographic apparatus further comprising:
a lens coupled to a side of the main body;
wherein the light emitted from the flash is radiated in a direction that is substantially parallel with an optical axis of the lens when the flash is received in the main body.

* * * * *